United States Patent
Kono et al.

(10) Patent No.: US 8,643,316 B2
(45) Date of Patent: Feb. 4, 2014

(54) POWER CONVERSION DEVICE

(75) Inventors: Masaki Kono, Tokyo (JP); Sho Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 152 days.

(21) Appl. No.: 13/058,888

(22) PCT Filed: Aug. 3, 2009

(86) PCT No.: PCT/JP2009/003670
§ 371 (c)(1),
(2), (4) Date: Feb. 14, 2011

(87) PCT Pub. No.: WO2010/026699
PCT Pub. Date: Mar. 11, 2010

(65) Prior Publication Data
US 2011/0140642 A1    Jun. 16, 2011

(30) Foreign Application Priority Data

Sep. 5, 2008 (JP) .................... 2008-227789

(51) Int. Cl.
| | |
|---|---|
| H02P 1/00 | (2006.01) |
| H02P 3/18 | (2006.01) |
| H02P 21/00 | (2006.01) |
| H02P 7/00 | (2006.01) |

(52) U.S. Cl.
USPC ....... 318/139; 318/376; 318/400.02; 318/432

(58) Field of Classification Search
USPC .............................. 318/139, 376, 400.02, 432
See application file for complete search history.

(56) References Cited

U.S. PATENT DOCUMENTS

| | | | | |
|---|---|---|---|---|
| 6,400,107 | B1 * | 6/2002 | Nakatani et al. | 318/400.21 |
| 7,893,637 | B2 * | 2/2011 | Suhama et al. | 318/376 |
| 7,960,930 | B2 * | 6/2011 | Sato | 318/432 |
| 2009/0121669 | A1 | 5/2009 | Hanada | |
| 2009/0237013 | A1 * | 9/2009 | Sato | 318/400.02 |
| 2009/0243522 | A1 * | 10/2009 | Suhama et al. | 318/376 |

FOREIGN PATENT DOCUMENTS

| | | |
|---|---|---|
| JP | 2001 292589 | 10/2001 |
| JP | 2003-18703 | 1/2003 |
| JP | 2006-50863 | 2/2006 |

(Continued)

OTHER PUBLICATIONS

Office Action issued Jul. 13, 2012, in Korean Patent Application No. 2011-7005067 with Partial English-language translation.

(Continued)

*Primary Examiner* — Eduardo Colon Santana
*Assistant Examiner* — Gabriel Agared
(74) *Attorney, Agent, or Firm* — Oblon, Spivak, McClelland, Maier & Neustadt, L.L.P.

(57) ABSTRACT

Based on rotation information of a synchronous machine detected by a rotation information detector, a controller causes a converter to boost a charge voltage of a capacitor so as to be higher than an induced voltage generated by the synchronous machine at a time of shifting to a coasting operation, maintains the charge voltage during the coasting operation, and performs weak field control so that the induced voltage generated by the synchronous machine becomes lower than a DC voltage at the time of shifting from the coasting operation to a power running operation or to a regenerative operation.

7 Claims, 14 Drawing Sheets

(56) References Cited

FOREIGN PATENT DOCUMENTS

| JP | 2006 050866 | 2/2006 |
|---|---|---|
| JP | 2007 028852 | 2/2007 |
| JP | 2007 306658 | 11/2007 |

OTHER PUBLICATIONS

Masaki Okamura, et al., "Development of Hybrid Electric Drive System Using a Boost Converter", EVS20, Nov. 2003, 12 pages.

International Search Report Issued Nov. 2, 2009 in PCT/JP09/003670 filed Aug. 3, 2009.

Japanese Office Action issued on Jul. 10, 2012, in patent Application No. 2010-527664 (with partial English Translation).

Combined Office Action and Search Report issued Sep. 26, 2012 in Chinese Patent Application No. 200980134452.6 with English language translation and English translation of categories of cited documents.

* cited by examiner

POWER CONVERSION DEVICE

TECHNICAL FIELD

The present invention relates to a power conversion device for driving synchronous machines used for electric vehicles, such as railway vehicles and electric motor vehicles, for example, and particularly relates to a power conversion device which is adaptable to an induced voltage of a synchronous machine during a high speed operation.

BACKGROUND ART

Conventionally, in a power conversion device used for electric vehicles, AC power collected from overhead wires via pantographs is converted by a converter into DC power. Alternatively, the DC power is directly collected from pantographs. The DC power is inputted to an inverter through a capacitor, which is used for energy storage and suppresses fluctuation in the power-supply voltage. The DC power inputted to the inverter is converted to AC power having a variable voltage and a variable frequency, and the converted AC power is supplied to a synchronous machine of a permanent-magnet type.

Here, since the synchronous machine mounts therein a permanent magnet, the synchronous machine constantly induces electromotive force even during its rotation. The induced voltage becomes large in proportion to the speed, and when an electric motor vehicle runs at a high speed, the induced voltage exceeding the power-supply voltage will be generated. Thus, during a power running operation, the driving torque of the synchronous machine is controlled by so-called weak field control, i.e., by controlling the induced voltage as well as the current of the synchronous machine by means of the inverter, and during a regenerative operation, the braking torque of the synchronous machine is controlled.

Meanwhile, in the case of controlling the electric motor vehicles using a synchronous machine of a permanent-magnet type, an inverter is usually stopped during coasting. However, when the inverter is stopped, the synchronous machine works as a generator, and the regenerated energy flows to the power supply side through a diode in the inverter, and as a result, the electric motor vehicle performs a braking operation instead of a coasting operation.

In order to prevent such a phenomenon, in the conventional technology, a load contactor is arranged between a synchronous machine and an inverter, and during the coasting operation, the load contactor arranged between the synchronous machine and the inverter is opened (OFF state) and the power supply line is blocked so as to prevent the regenerated energy of the synchronous machine from flowing to the inverter. In addition, at the time of re-activation, i.e., shifting from the coasting operation to the power running operation, in order to prevent unnecessary flow of regenerated energy into the inverter and the consequent damages of switching elements of the inverter, the converter is controlled before the load contactor is powered ON so that the voltage of a direct current side circuit of the inverter is boosted to be equal to or higher than the peak value of the induced voltage between terminals of the synchronous machine, and then the load contactor is powered ON (e.g., see Patent document 1 listed below).

CITATION LIST

[Patent Documents]
[Patent document 1] Japanese Laid-Open Patent Publication No. 2007-28852 (Page 68, FIG. 63)

DISCLOSURE OF THE INVENTION

Problems to be Solved by the Invention

In conventional power conversion devices, at the time of shifting from a power running operation or regenerative operation to a coasting operation, a load contactor, which is connected between the synchronous machine and the inverter, blocks a path therebetween. In addition, at the time of re-activation, that is, shifting from the coasting operation to the power running operation or regenerative operation, the load contactor connected between the synchronous machine and the inverter is powered ON. Therefore, conventionally, when shifting between the operation modes, that is, the shifting from the power running operation or regenerative operation to the coasting operation, and shifting from the coasting operation to the power running operation or regenerative operation, occurs frequently, the number of times of opening/closing operations of the load contactor increases accordingly, resulting in shortening of the working life of the load contactor.

In addition, the load contactor arranged between the synchronous machine and the inverter is large-sized, since it needs to cut off a large current. This fact deters downsizing and weight reduction, and in addition, this is costly.

In addition, conventionally, at the time of shifting from the coasting operation to the power running operation, in order to prevent the current from flowing from the synchronous machine to the inverter, the voltage of the direct current side circuit of the inverter needs to be boosted sufficiently before activation of the inverter, which causes a problem of an increase in a time-lag between when an operation start command is given to the inverter and when the inverter is actually re-activated.

The present invention has been made to solve the above problems, and is directed to provide a power conversion device which does not require a load contactor conventionally arranged between the synchronous machine and the inverter, and which facilitates downsizing, weight reduction, and cost reduction even when the operation mode shifts frequently.

Solution to the Problems

The power conversion device of the present invention includes: a first power converter which obtains a DC voltage from a power supply; a capacitor which is connected to an output side of the first power converter; a second power converter which converts the DC voltage of the capacitor into an AC voltage and outputs the AC voltage to a synchronous machine; rotation information detection means which detects rotation information of the synchronous machine; and control means which controls the first power converter and the second power converter, based on the rotation information detected by the rotation information detection means. Based on the rotation information of the synchronous machine detected by the rotation information detection means, the control means controls the second power converter so that a voltage generated by the synchronous machine is lower than or equal to a charge voltage of the capacitor at the time of activation of the second power converter from a coasting operation mode, and also controls the first power converter so that the charge voltage of the capacitor is equal to or higher than the voltage generated by the synchronous machine.

Effect of the Invention

According to the power conversion device of the present invention, even in the case of frequent shifting between the operation modes, such as shifting from the power running operation or regenerative operation to the coasting operation, and shifting from the coasting operation to the power running operation or regenerative operation, it is possible to certainly prevent unnecessary back flow of electric power from the synchronous machine to the power supply side, and also possible to prevent generation of unnecessary braking torque. Therefore, a load contactor which has been conventionally arranged between a synchronous machine and a second power converter can be eliminated, and significant effects of down-sizing, weight reduction, and cost reduction of the power conversion device can be achieved.

BEST MODE FOR CARRYING OUT THE INVENTION

Embodiment 1

Figure 1:
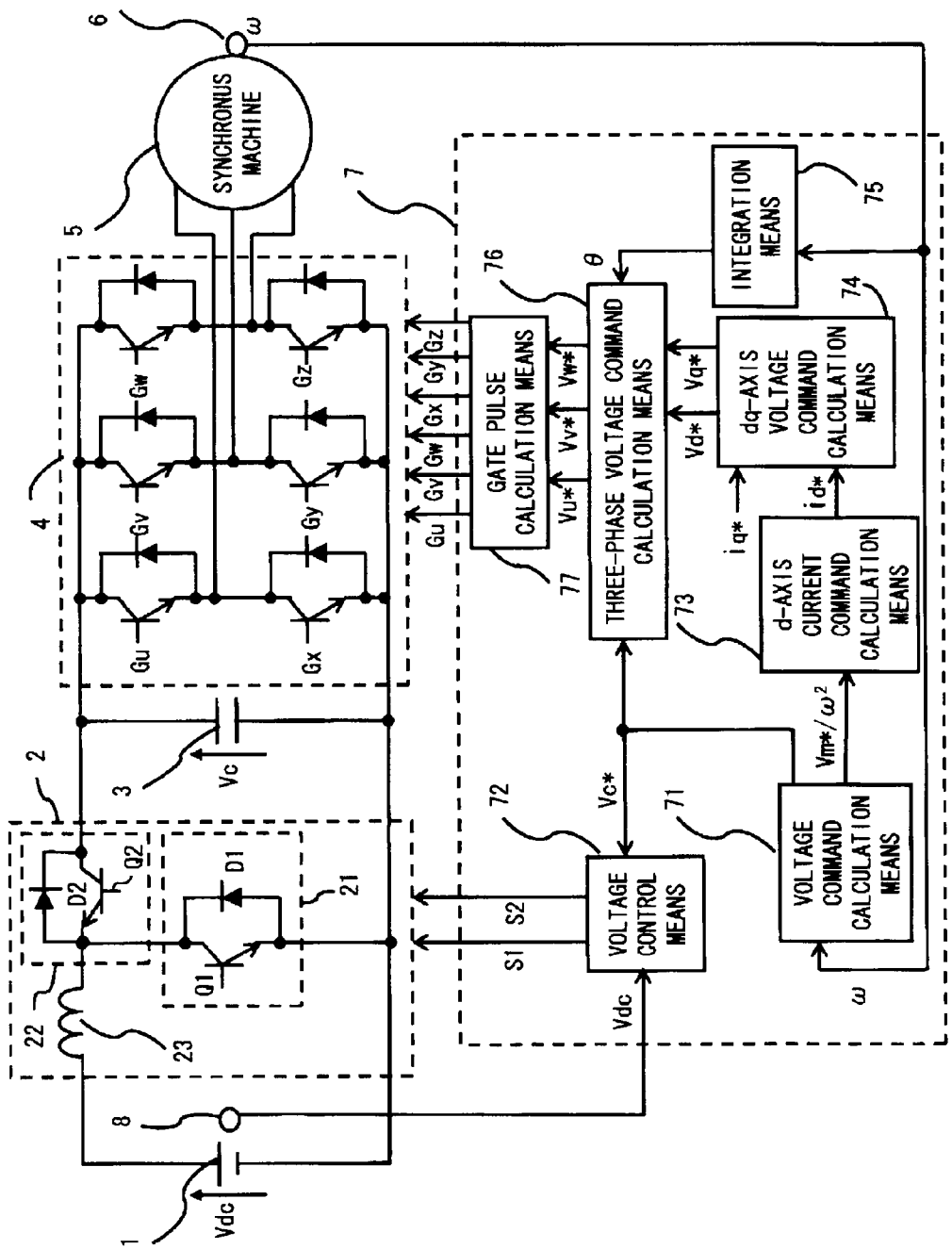
FIG. 1 is a configuration diagram illustrating a power conversion device according to embodiment 1 of the present invention.

FIG. 1 is a configuration diagram illustrating a power conversion device according to embodiment 1 of the present invention.

The power conversion device according to this embodiment includes: a DC/DC type converter 2 which is a first power converter for obtaining a DC voltage of a predetermined voltage value from a DC power supply 1; a capacitor 3 which is connected to the converter 2 on its output side and is used for energy storage; an inverter 4 which is a second power converter for converting the DC voltage of the capacitor 3 into an AC voltage thereby to output the AC voltage to a synchronous machine 5; a rotation information detection means 6 which detects rotation information (in this case, rotational speed $\omega$) of the synchronous machine 5; a DC voltage detection means 8 which detects a DC supply voltage Vdc of the DC power supply 1; and a control means 7 which controls the converter 2 and the inverter 4, based on the rotational speed $\omega$ of the synchronous machine 5 detected by the rotation information detection means 6 and on the DC supply voltage Vdc detected by the DC voltage detection means 8.

The above-described converter 2 is a boost chopper circuit, and includes: a first switching means 21 which is constituted of an inverse-parallel connection of a switching element Q1 such as an IGBT, and a diode D1; and a second switching means 22 which is constituted of an inverse-parallel connection of a switching element Q2 such as an IGBT, and a diode D2; and a reactor 23. Further, the synchronous machine 5 is a permanent-magnet type synchronous machine (hereinafter simply referred to as synchronous machine) which creates a magnetic field by means of a permanent magnet fixed to a rotor.

The above-described control means 7 is, for example, constituted of a microcomputer, and is provided, upon installation of a predetermined calculation program, with a voltage command calculation means 71, a voltage control means 72, a d-axis current command calculation means 73, a dq-axis voltage command calculation means 74, an integration means 75, a three-phase voltage command calculation means 76, and a gate pulse calculation means 77.

The voltage command calculation means 71 of the control means 7 calculates and outputs a charge voltage command Vc* for controlling the charge voltage Vc of the capacitor 3, and a voltage command (Vm*/$\omega^2$) for controlling a voltage (in this case, a line voltage peak value) Vm generated by the synchronous machine 5, based on the rotational speed $\omega$ of the synchronous machine 5 detected by the rotation information detection means 6.

The voltage control means 72 controls the converter 2 based on the charge voltage command Vc* outputted by the voltage command calculation means 71 and on the DC supply voltage Vdc detected by the DC voltage detection means 8. The d-axis current command calculation means 73 calculates and outputs a d-axis current command id*, based on the voltage command (Vm*/$\omega^2$) given from the voltage command calculation means 71 and on the rotational speed $\omega$ of the synchronous machine 5. The dq-axis voltage command calculation means 74 calculates and outputs a d-axis voltage command vd* and a q-axis voltage command vq*, based on the d-axis current command id* given from the d-axis current command calculation means 73 and on the q-axis current command iq*, respectively.

The integration means 75 calculates and outputs a phase $\theta$ by integrating the rotational speed $\omega$ detected by the rotation information detection means 6. The three-phase voltage command calculation means 76 calculates and outputs three-phase voltage commands Vu*, Vv*, and Vw*, based on the d-axis voltage command vd* and the q-axis voltage command vq* given from the dq-axis voltage command calculation means 74, and on the phase θ. The gate pulse calculation means 77 calculates and outputs gate pulse signals Gu, Gv, Gw, Gx, Gy, Gz for controlling switching elements of the inverter 4, based on the three-phase voltage commands Vu*, Vv*, and Vw* given from the three-phase voltage command calculation means 76.

Figure 2:
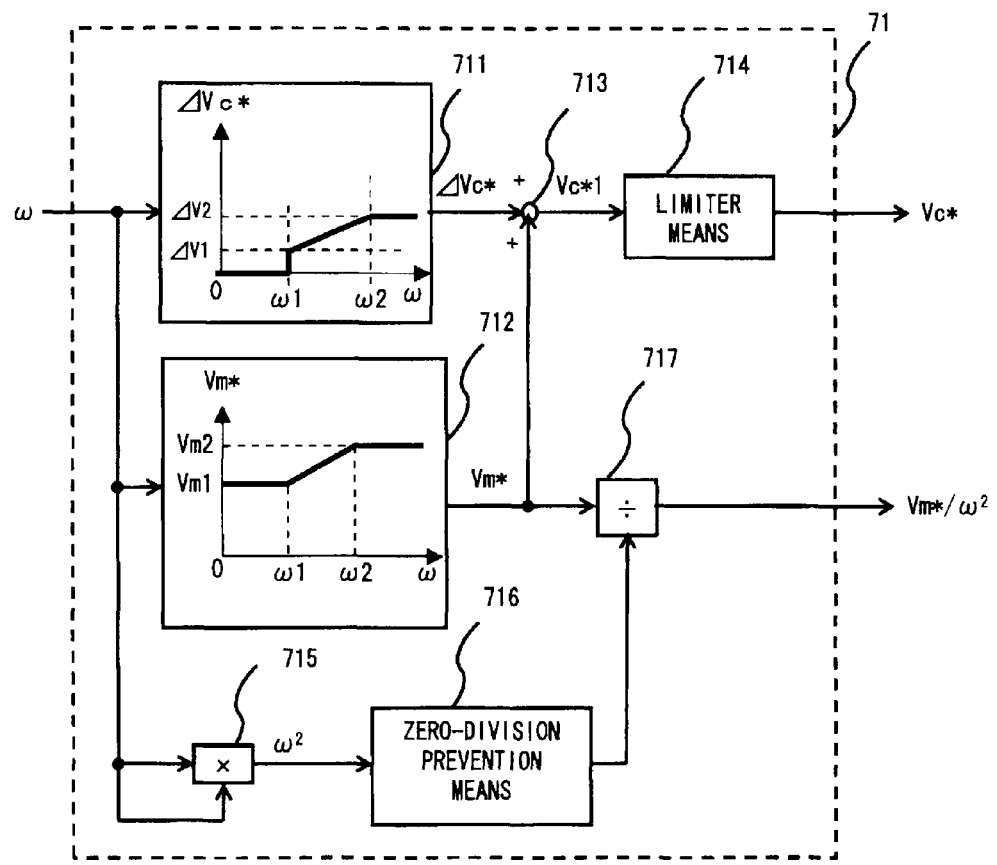
FIG. 2 is a configuration diagram illustrating in detail a voltage command calculation means of the power conversion device.

FIG. 2 is a configuration diagram illustrating in detail the voltage command calculation means 71.

The voltage command calculation means 71 includes a capacitor voltage increment calculation table 711, a line voltage peak value command calculation table 712, an adder 713, a limiter means 714, a multiplier 715, a zero-division prevention means 716, and a divider 717.

It is noted that, the configuration and operation of the control means 7 including the voltage command calculation means 71 will be described later in detail.

Next, the principle of the weak field control for the synchronous machine 5 in embodiment 1 will be described.

The voltage equation represented on the dq coordinates in the synchronous machine 5, and torque T are calculated from Expressions (1) and (2) below.

[Expression 1]

$$\begin{bmatrix} v_d \\ v_q \end{bmatrix} = \begin{bmatrix} R + pL_d & -\omega L_q \\ \omega L_d & R + pL_q \end{bmatrix} \begin{bmatrix} i_d \\ i_q \end{bmatrix} + \begin{bmatrix} 0 \\ \omega \cdot \phi_a \end{bmatrix} \quad (1)$$

[Expression 2]

$$T = Pn \cdot \phi_a \cdot i_q + Pn \cdot (L_d - L_q) \cdot i_d \cdot i_q \quad (2)$$

Here, id and iq respectively represent d-axis and q-axis components of an armature current; vd and vq respectively represent d-axis and q-axis components of an armature voltage; $\phi_a = \sqrt{(3/2)\phi f}$; φf represents a maximum value of an armature flux linkage caused by the permanent magnet; R represents an armature resistance; Ld and Lq respectively represent d-axis and q-axis inductances; p=d/dtf; Pn represents the number of pairs of poles; and ω represents a rotational speed (electric angular velocity).

In a high speed region, when the inverter 4 is to be re-activated for shifting from a coasting operation to a power running operation, weak field control needs to be performed immediately after the inverter 4 is re-activated. That is, the induced voltage of the synchronous machine 5 is a function of the rotational speed ω, and increases in proportion to the rotational speed ω. Consequently, during a high speed running, induced voltage exceeding the supply voltage is generated. Therefore, when the inverter 4 is to be re-activated, especially in the case of being in a high speed region, weak field control, which utilizes demagnetization caused by d-axis armature reaction, needs to be performed so as to prevent back flow of the regenerated energy from the synchronous machine 5 to the inverter 4.

A terminal voltage |Vm| supplied to the synchronous machine 5 is represented as $|Vm|=\sqrt{(vd^2+vq^2)}$. In this case, 1Vm1 corresponds to the line voltage peak value. When the charge voltage of the capacitor 3 on the input side of the inverter 4 is Vc, in order to prevent a current from flowing from the synchronous machine 5 to the inverter 4 at the time of re-activating the inverter 4, the line voltage peak value Vm is restricted to satisfy Expression (3) below, where the charge voltage of the capacitor 3 is Vc.

[Expression 3]

$$|Vm| = \sqrt{v_d^2 + v_q^2} \le \frac{Vc}{\sqrt{2}} \quad (3)$$

Accordingly, the value of the d-axis current id to satisfy the voltage restriction condition of Expression (3) described above is calculated next. For that, first, if Expression (3) is simplified, Expression (4) will be obtained as described below.

[Expression 4]

$$\sqrt{v_{d0}^2 + v_{q0}^2} \le \frac{Vc}{\sqrt{2}} \quad (4)$$

Here, vd0 and vq0 are values that ignore differential terms.

Next, when the weak field control is performed at the time of re-activating the inverter 4, the synchronous machine 5 is in a high speed region, and thus ωL is considered to be sufficiently large. When the amount of drop in the armature resistance is ignored, Expression (1) can be simplified to Expression (5) below.

[Expression 5]

$$\begin{bmatrix} v_{d0} \\ v_{q0} \end{bmatrix} = \begin{bmatrix} 0 & -\omega L_q \\ \omega L_d & 0 \end{bmatrix} \begin{bmatrix} i_d \\ i_q \end{bmatrix} + \begin{bmatrix} 0 \\ \omega \cdot \phi_a \end{bmatrix} \quad (5)$$

Based on Expressions (4) and (5) described above, the condition of the d-axis current id for weak field control is expressed by Expression (6) below.

[Expression 6]

$$i_d = -\frac{\phi_a}{L_d} + \frac{1}{L_d}\sqrt{\left(\frac{Vc/\sqrt{2}}{\omega^2}\right)^2 - (L_d \cdot i_q)^2} \quad (6)$$

In order to prevent generation of torque so as not to cause unnecessary shock to a vehicle or the like at the time of re-activating the inverter 4, torque T=0 needs to be satisfied in Expression (2). For that case, iq=0 needs to be satisfied, and thus when iq=0 is assigned in Expression (6), Expression (7) will be obtained as described below.

[Expression 7]

$$i_d = -\frac{\phi_a}{L_d} + \frac{1}{L_d}\frac{Vc/\sqrt{2}}{\omega^2} \quad (7)$$

If the d-axis current id for weak field control is determined so as to satisfy this Expression (7), it is possible to satisfy the voltage restriction condition on the line voltage peak value Vm shown in Expression (3), and also possible to prevent generation of torque (T=0) at the time of re-activating the inverter 4.

As is clear from Expression (7), Ld represents a d-axis inductance, φf represents a maximum value of the armature flux linkage caused by the permanent magnet, and both are constant values determined depending on the characteristics of the synchronous machine. Thus, the d-axis current id in Expression (7) is a function of the charge voltage Vc of the capacitor 3 and the rotational speed ω of the synchronous machine 5. Accordingly, when the charge voltage Vc of the capacitor 3 and the rotational speed ω of the synchronous machine 5 are given in Expression (7), it is possible to obtain a d-axis current id which can control the line voltage peak value Vm to be lower than or equal to the charge voltage Vc of the capacitor 3 (Vm≤Vc), and which is necessary for preventing generation of torque.

Meanwhile, in the case where the weak field control is performed to the synchronous machine 5 at the time of re-activating the inverter 4, the boundary condition necessary for preventing a current from flowing from the synchronous machine 5 to the inverter 4 is that the line voltage peak value Vm should be equal to the effective value of the charge voltage (Vc/√2) of the capacitor 3. Thus, in Expression (7), if a line voltage peak value command Vm* (hereinafter, addition of * indicates a command value) is used in place of the effective value of the charge voltage (Vc/√2) of the capacitor 3, and if information on the rotational speed ω is given, it is possible to calculate the d-axis current command id* which can prevent a current from flowing from the synchronous machine 5 to the inverter 4, and which satisfies the condition necessary for preventing generation of torque (T=0). Accordingly, when the charge voltage command Vc* to the capacitor 3 is set higher by a constant increment ΔVc* than the line voltage peak value command Vm* under a critical state that satisfies Expression (7) (Vc*=Vm*+ΔV*), Vm*≤Vc* is constantly satisfied, and consequently it is possible to certainly prevent a current from flowing from the synchronous machine 5 to the inverter 4 at the time of re-activating the inverter 4.

Thus, in this embodiment 1, the rotational speed ω, the line voltage peak value command Vm*, and the charge voltage command Vc* are obtained as follows.

First, the rotational speed ω of the synchronous machine 5 is detected by the rotation information detection means 6. The detected rotational speed ω is inputted to the voltage command calculation means 71 and the integration means 75 of the control means 7.

As illustrated in FIG. 2, the capacitor voltage increment calculation table 711 of the voltage command calculation means 71 tabulates the relation of the voltage increment ΔVc* (vertical axis) relative to the rotational speed ω (horizontal axis). In this case, when the rotational speed ω ranges from zero to ω1, the voltage increment is set to zero, and when the rotational speed ω is ω1, the voltage increment is set to ΔV1. ΔV1 is set in consideration of an ON voltage based on an ON resistance of each of the switching elements included in the inverter 4, in order to set the charge voltage Vc of the capacitor 3 to be constantly higher than the line voltage peak value Vm of the synchronous machine 6 for preventing back flow of regenerated energy.

That is, normally, each switching element included in the inverter 4 is selected and designed based on the DC supply voltage Vdc, and at that time, inventors of the present invention have found that the ON voltage based on the ON resistance of each switching element of the inverter 4 is 1% or more and 5% or less of the voltage Vdc of the DC power supply. Therefore, the ΔV1 is set to be 1% or more and 5% or less of the voltage Vdc of the DC power supply. In addition, ΔV2 is set so that the gradient between ω1 and ω2 is the same as the gradient between ω1 and ω2 in the line voltage peak value command calculation table 712. For the speed equal to or higher than ω2, ΔV2 is set to be a constant value since the setting is unnecessary for the speed higher than ω2 in terms of the performance of the synchronous machine 5.

In addition, the line voltage peak value command calculation table 712 tabulates the relation of the line voltage peak value command Vm* (vertical axis) to the synchronous machine 5 relative to the rotational speed ω (horizontal axis). In this case, when the rotational speed ω ranges from zero to ω1, the line voltage peak value command is set to Vm1. Here, Vm1 has the same value as the DC supply voltage Vdc. In addition, when the rotational speed ω is ω2 or more, the line voltage peak value command is set to Vm2. The Vm2 is set to be the same value as the induced voltage at the time when the synchronous machine 5 is at the maximum speed. The gradient between ω1 and ω2 is set to change linearly from ΔVm1 to ΔVm2. Therefore, when the rotational speed is ω1 or more, the induced voltage generated by the synchronous machine 5 will be equal to or higher than DC supply voltage Vdc. For the speed equal to or higher than ω2, Vm2 is set to be a constant value since the setting is unnecessary in terms of the performance of the synchronous machine 5.

The adder 713 adds the voltage increment ΔVc* outputted from the capacitor voltage increment calculation table 711 and the line voltage peak value Vm* outputted from the line voltage peak value command calculation table 712, which are based on the rotational speed ω of the synchronous machine 5 detected by the rotation information detection means 6, and outputs the added value Vc1*. That is, Vc1*=Vm*+ΔVc*.

Next, the limiter means 714 has a function of preventing the value Vc1* calculated by the adder 713 from being unexpectedly smaller or larger. That is, the limiter means 714 processes the signal Vc1* as follows and outputs the charge voltage command Vc*.

[Equation 8]

$$Vc1^* < Vmin : Vc^* = Vmin \\ Vmin \leq Vc1^* \leq Vmax : Vc^* = Vc1^* (= Vm^* + \Delta V_c) \\ Vc1^* > Vmax : Vc^* = Vmax \qquad (8)$$

It is noted that, Vmin is set to be the same value as the minimum DC voltage value that enables driving of the inverter 4, and Vmax is set to be the same as a value set for protecting the inverter 4 from overvoltage. In this manner, the limiter means 714 outputs the charge voltage command Vc* to the capacitor 3.

In addition, the rotational speed ω of the synchronous machine 5 detected by the rotation information detection means 6 is squared by the multiplier 715, and $\omega^2$ is outputted. The divider 717 divides, by $\omega^2$, the line voltage peak value command Vm* outputted from the line voltage peak value command calculation table 712. At that time, the zero-division prevention means 716 in the step prior to the divider 717 performs the following processing in order to prevent division by zero. That is, when $\omega^2$ is zero, the zero-division prevention means 716 outputs a small value such as 0.0001, instead of zero. Accordingly, division by zero can be prevented. The divider 717 outputs (Vm*/$\omega^2$), and the output is given to the d-axis current command calculation means 73 in the subsequent step. The value of (Vm*/$\omega^2$) is used for calculation of the d-axis current command id* based on Expression (9) below.

The voltage control means 72 receives the charge voltage command Vc* from the voltage command calculation means 71 and also receives the DC supply voltage Vdc detected by the DC voltage detection means 8. The voltage control means 72 compares both of Vc* and Vdc, and based on the comparison result, outputs switching signals S1 and S2, respectively, to the first and second switching means 21 and 22 of the converter 2, thereby controlling the switching operation. The operation of this case will be described later in detail with reference to the timing chart shown in FIG. 3.

Meanwhile, the d-axis current command calculation means 73 receives (Vm*/ω²) from the voltage command calculation means 71, and calculates the d-axis current command id*, using Expression (9) below.

[Expression 9]

$$i_d^* = -\frac{\phi a}{Ld} + \frac{1}{Ld}\left(\frac{Vm^*}{\omega^2}\right) \quad (9)$$

Here, Ld represents a d-axis inductance, φa=√{(3/2)φf}, and φf represents a maximum value of the armature flux linkage caused by the permanent magnet.

As described with reference to Expression (7), Expression (9) uses the line voltage peak value command Vm* in place of the effective value (Vc/√2) of the charge voltage of the capacitor 3, and thereby calculating the d-axis current command id* which prevents a current from flowing from the synchronous machine 5 to the inverter 4, and which satisfies the condition necessary for preventing generation of torque (T=0).

Next, the dq-axis voltage command calculation means 74 calculates the d-axis voltage command vd* and q-axis voltage command vq*, based on Expression (10) below, while using the d-axis current command id* calculated by the d-axis current command calculation means 73 and q-axis current command iq*=0.

[Expression 10]

$$\begin{bmatrix} v_d^* \\ v_q^* \end{bmatrix} = \begin{bmatrix} R^* & -\omega \cdot L_q^* \\ \omega \cdot L_d^* & R^* \end{bmatrix} \begin{bmatrix} i_d^* \\ i_q^* \end{bmatrix} + \begin{bmatrix} 0 \\ \omega \cdot \phi_a^* \end{bmatrix} \quad (10)$$

In this Expression (10), since the q-axis current command iq* is set to zero, as is clear from Expression (2) described above, it is possible to prevent generation of unnecessary torque at the time of re-activating the inverter 4. The d-axis voltage command vd* and q-axis voltage command vq* which are calculated by the dq-axis voltage command calculation means 74 are given to the three-phase voltage command calculation means 76 in the subsequent step.

As is publicly known, when three-phase voltages or three-phase currents are to be transformed into a rotating orthogonal two-axis coordinates system, a phase θ of the control coordinate axes is required. Thus, the integration means 75 calculates the phase θ of the control coordinate axes on rotating two-axis coordinates, based on the rotational speed ω, using Expression (11) below.

[Expression 11]

$$\theta = \int \omega \cdot dt \quad (11)$$

Next, the three-phase voltage command calculation means 76 calculates a voltage phase θv of the three-phase voltage commands, based on the d-axis voltage command vd* and q-axis voltage command vq* which are given by the dq-axis voltage command calculation means 74, and on the phase θ given by the integration means 75, using the Expression (12) below.

[Expression 12]

$$\theta_v = \theta + \tan^{-1}\left(\frac{v_q^*}{v_d^*}\right) \quad (12)$$

In addition, the three-phase voltage command calculation means 76 calculates a modulation factor, using Expression (13) below.

[Expression 13]

$$PMF = \frac{\sqrt{(v_d^*)^2 + (v_q^*)^2}}{\frac{\sqrt{6}}{\pi} Vc^*} \quad (13)$$

Next, the three-phase voltage command calculation means 76 calculates the three-phase voltage commands Vu*, Vv*, and Vw*, using the Expressions (11), (12), and (13) described above and using Expression (14) below.

[Expression 14]

$$\begin{bmatrix} V_u^* \\ V_v^* \\ V_w^* \end{bmatrix} = PMF \times \begin{bmatrix} \cos\theta_v \\ \cos\left(\theta_v - \frac{2}{3}\pi\right) \\ \cos\left(\theta_v - \frac{4}{3}\pi\right) \end{bmatrix} \quad (14)$$

The three-phase voltage commands Vu*, Vv*, and Vw* calculated by the three-phase voltage command calculation means 76 are inputted to the gate pulse calculation means 77. The gate pulse calculation means 77 generates gate pulses Gu to Gz, based on the three-phase voltage commands Vu*, Vv*, and Vw* thereby to control the switching elements of the inverter 4 using PWM (pulse width modulation) control.

Next, as to the entire control operation of the power conversion device having the above-described configuration, a case of shifting from the power running operation to the coasting operation and then shifting from the coasting operation to the power running operation will be described with reference to the timing chart shown in FIG. 3.

When the power running operation, such as acceleration of a vehicle, is in progress, the control means 7 sets the charge voltage command Vc* to the capacitor 3 to be substantially the same as the DC supply voltage Vdc. Thus, the switching signal S1 is not outputted from the voltage control means 72 to the converter 2, and the first switching means 21 is switched OFF. On the other hand, the switching signal S2 is outputted, and the second switching means 22 is switched ON. Accordingly, DC power is supplied from the DC power supply 1 to the inverter 4 via the converter 2, and the inverter 4 converts the DC power into AC power having a predetermined frequency thereby to supply the AC power to the synchronous machine 5.

At this time, since the first switching means 21 performs no switching operation, the charge voltage Vc of the capacitor 3 is substantially the same as the DC supply voltage Vdc. In addition, due to the weak field control based on above-described Expression (10) performed by the control means 7, the line voltage peak value Vm of the synchronous machine 5 is smaller than the charge voltage Vc of the capacitor 3.

Next, when the power running operation is shifted to the coasting operation at time t1, an operation command is turned OFF. At that time, the charge voltage command Vc* to the capacitor 3 from the control circuit 7 is higher than the DC supply voltage Vdc. In this case, the charge voltage Vc of the capacitor 3 needs to be increased. Thus, the voltage control means 72 stops output of the switching signal S2 to the converter 2, and the second switching means 22 is switched OFF. The voltage control means 72, on the other hand, outputs the switching signal S1, and the switching operation is performed by the first switching means 21. Due to the switching operation of the first switching means 21, the capacitor 3 is charged, and at time t2, the voltage of the capacitor 3 is boosted to a predetermined value corresponding to the charge voltage command Vc*. During the period Ta between time t1 to time t2, the synchronous machine 5 is continuously subjected to the weak field control by the control means 7, based on Expression (10), and thus, the line voltage peak value Vm does not change and keeps the same value as that at the time of the power running operation.

At time t2, the charge voltage of the capacitor 3 is boosted to a value corresponding to the charge voltage command Vc*, and thus the operation of the inverter 4 stops. Accordingly, the synchronous machine 5 is no more subjected to the weak field control, and thus the line voltage peak value Vm is an induced voltage determined depending on the rotational speed ω of the synchronous machine 5. In addition, during a period Tb between time t2 to time t3, the voltage control means 72 stops output of the switching signal S2 to the converter 2, but outputs the switching signal S1. Accordingly, in the converter 2, the first switching means 21 continues to perform the switching operation while the second switching means 22 is in an OFF state. Thus, during the period Tb, the charge voltage Vc of the capacitor 3 is maintained equal to or higher than the induced voltage Vm generated by the synchronous machine 5. That is, the charge voltage Vc of the capacitor 3 is set higher than the induced voltage Vm generated by the synchronous machine 5, by an amount corresponding to the voltage increment ΔVc* calculated by the voltage command calculation means 71 of the control means 7. Accordingly, it is possible to prevent a current from flowing from the synchronous machine 5 to the inverter 4 during the coasting operation, and as a result, it is possible to prevent generation of unnecessary braking torque during the coasting operation.

When the coasting operation is shifted to the power running operation at time t3, the control means 7 reactivates the inverter 4 accordingly. The control means 7 then performs the weak field control based on Expression (10) described above for the inverter 4, and thus the line voltage peak value Vm of the synchronous machine 5 lowers to the level before time t2. On the other hand, during a period Tc between time t3 to time t4, due to control by the voltage control means 72, the first switching means 21 continues to perform the switching operation while the second switching means 22 is in a OFF state in the converter 2. Thus, the charge voltage Vc of the capacitor 3 is maintained equal to the value during the period Tb of the coasting operation.

At time t4 after a predetermined time Tc has passed since an operation command was inputted, the charge voltage command Vc* to the capacitor 3 is set substantially equal to the DC supply voltage Vdc. At this time, the voltage control means 72 need not charge the capacitor 3 to boost the charge voltage Vc, and thus the first switching means 21 in the converter 2 is switched OFF, and the second switching means 22 is switched ON. Accordingly, charging to the capacitor 3 stops and the charge voltage Vc lowers gradually.

Next, at time t5, the charge voltage Vc of the capacitor 3 becomes substantially equal to the DC supply voltage Vdc. However, the line voltage peak value Vm of the synchronous machine 5 is lower than the charge voltage Vc of the capacitor 3 due to the weak field control by the control means 7.

Therefore, even if the coasting operation is shifted to the power running operation due to the operation command given at time t3, it is possible to prevent a current from flowing from the synchronous machine 5 to the inverter 4, and also possible to certainly prevent occurrence of failures such as damages in the switching elements of the inverter 4. In addition, at the time of re-activating the inverter 4, the charge voltage Vc of the capacitor 3 need not be boosted again, unlike the conventional techniques. Thus, no time-lag is caused between when an operation command is given to the inverter 4 and when the inverter 4 is actually re-activated, which indicates good responsiveness.

As described above, in embodiment 1, the control means 7 controls the converter 2 during the coasting operation such that the charge voltage Vc of the capacitor 3 is equal to or higher than the voltage Vm generated by the synchronous machine 5. In addition, the control means 7 controls the converter 2 and the inverter 4 also at re-activation of the inverter 4 from the coasting operation, such that the charge voltage Vc of the capacitor 3 is constantly maintained equal to or higher than the line voltage peak value Vm of the synchronous machine 5. Accordingly, even in the case of frequent shifting between operation modes, such as shifting from the power running operation or regenerative operation to the coasting operation, and shifting from the coasting operation to the power running operation or regenerative operation, it is possible to certainly prevent unnecessary back flow of electric power from the synchronous machine to the power supply side, and also possible to prevent generation of unnecessary braking torque. Therefore, a load contactor which has been conventionally arranged between the synchronous machine 5 and the inverter 4 can be eliminated, and consequently downsizing, weight reduction, and cost reduction can be enhanced.

Figure 4:
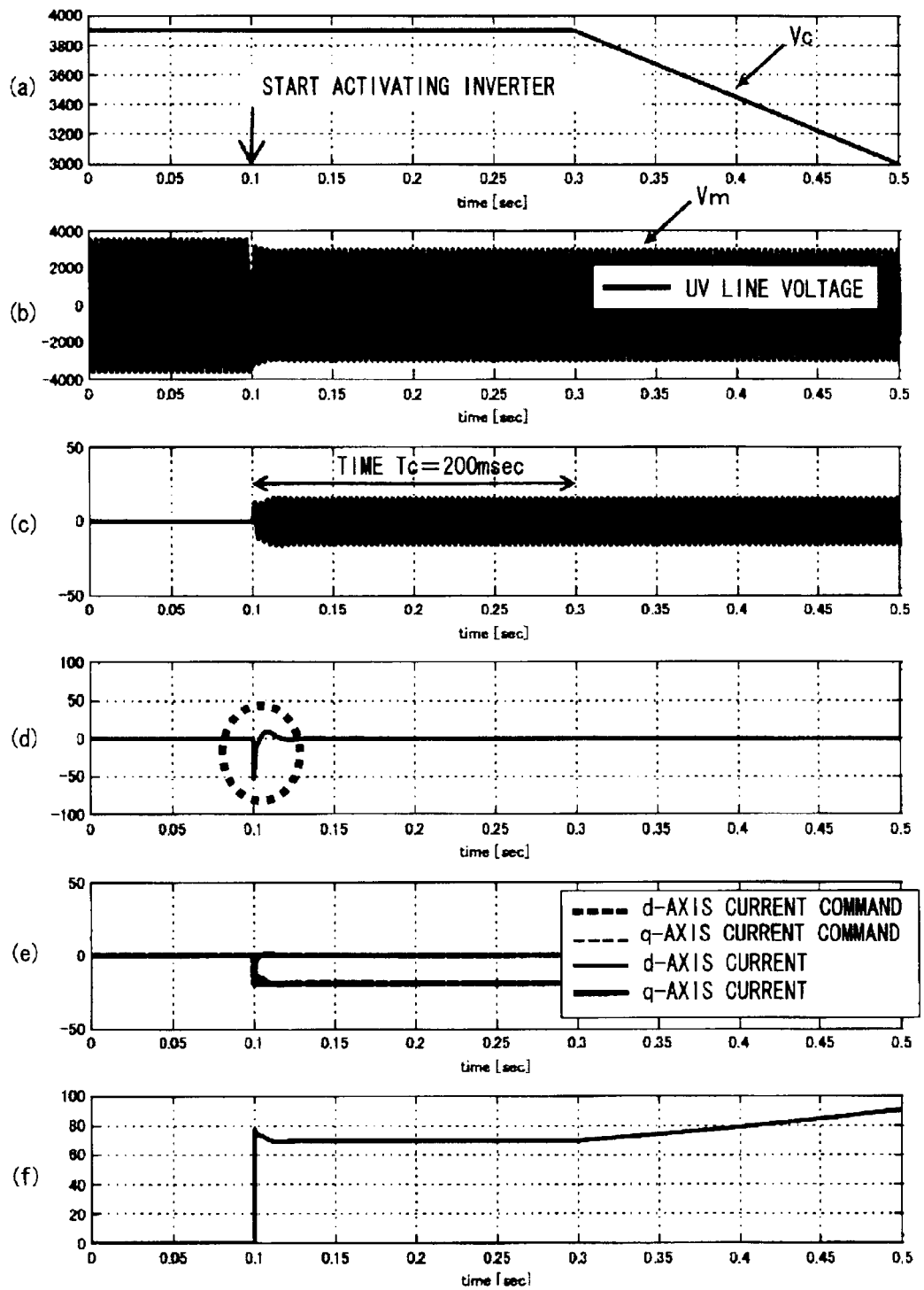
FIG. 4 is a characteristic diagram showing a result of simulation for checking an operation of the power conversion device according to embodiment 1 of the present invention.

FIG. 4 shows results of simulation of re-activation, in a power conversion device having a configuration described in embodiment 1, from a state where a rotational speed of a motor is 270 Hz, based on a motor constant for electric railcars. Here, the vertical axis in FIG. 4(a) represents a capacitor DC voltage [V], the vertical axis in FIG. 4(b) represents a line voltage [V], the vertical axis in FIG. 4(c) represents a U-phase current [A], the vertical axis in FIG. 4(d) represents a torque generated [Nm], the vertical axis in FIG. 4(e) represents d and q currents [A], and the vertical axis in FIG. 4(f) represents a modulation factor [%]. The horizontal axes in FIGS. 4(a) to (f) represent time [sec].

Figure 3:
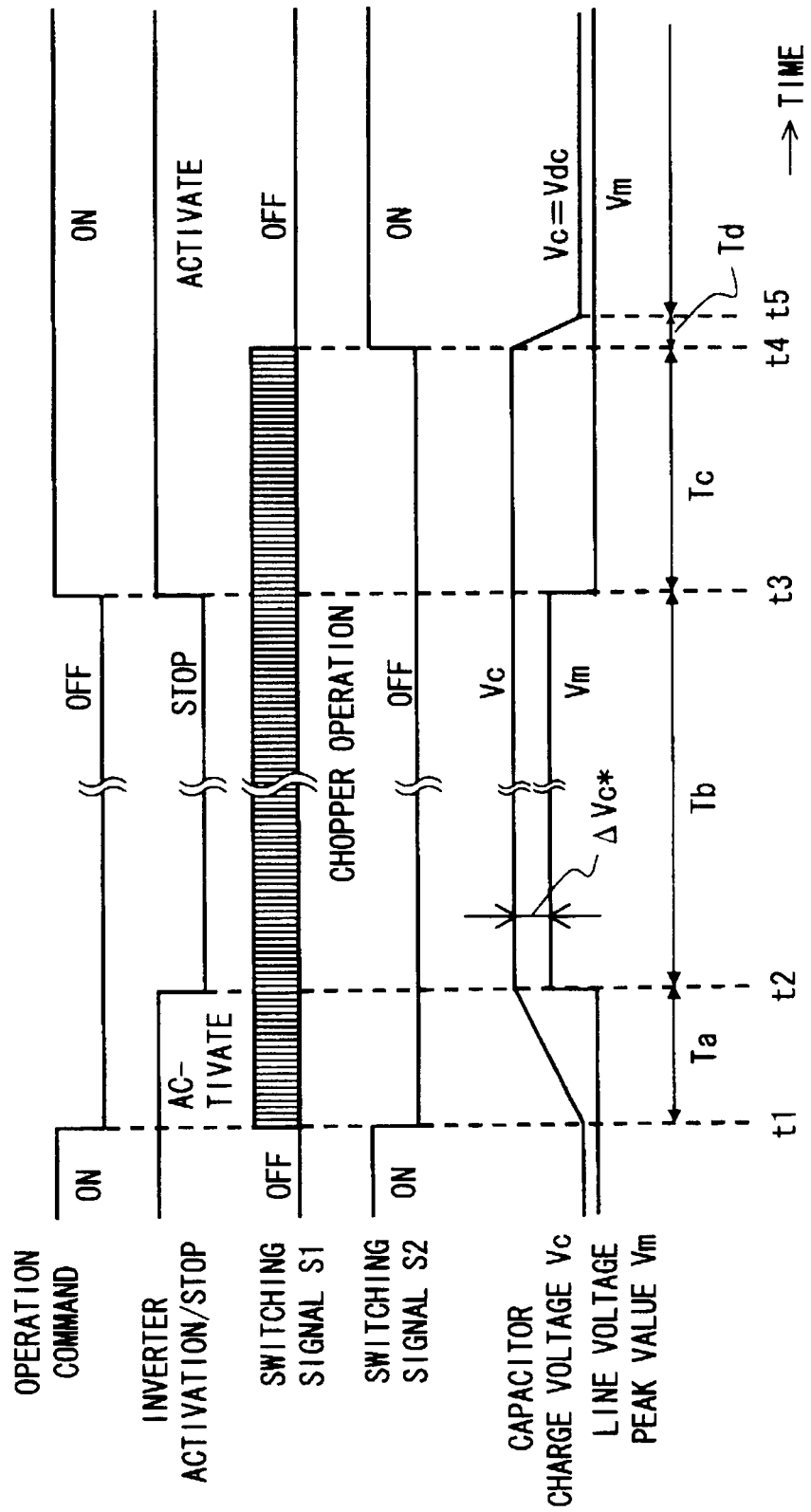
FIG. 3 is a timing chart for illustrating an operation according to embodiment 1 of the present invention.

According to the results of simulation shown in FIG. 4, the inverter 4 was activated at 0.1 sec. in horizontal axis (corresponding to time t3 in FIG. 3).

FIG. 4(a) shows the capacitor voltage Vc. From 0 to 0.3 sec., the first switching means 21 of the converter 2 performed the switching operation to keep the charge voltage Vc of the capacitor 3 at 3900V. At 0.3 sec. (corresponding to time t4 in FIG. 3), the first switching means 21 of the converter 2 was switched OFF, and the second switching means 22 was switched ON, and accordingly, the charge voltage Vc of the capacitor 3 gradually lowered to 3000 V, which was substantially the same as the voltage Vdc of the DC power supply 1.

FIG. 4(b) shows the line voltage peak value Vm of the synchronous machine 5. From 0 to 0.1 sec., the line voltage peak value Vm corresponded to an induced voltage generated by induction of the electromotive force of the synchronous machine 5, and the peak value of the voltage waveform was about 3850 V. At 0.1 sec. (corresponding to time t3 in FIG. 3), the inverter 4 was activated, and immediately thereafter the weak field control by the control means 7 started. Accordingly, the line voltage peak value Vm was controlled to a predetermined voltage, i.e., 3000 V. Further, FIG. 4(d) shows a torque generated immediately after the inverter 4 was activated. It was confirmed that although the torque temporarily generated in a transient period, the value thereof was substantially zero.

Further, the time (corresponding to time Tc in FIG. 3) after the inverter 4 was activated until the switching operation of the first switching means 21 of the converter 2 was stopped is preferably in a range from 5 msec. to 500 msec. This is based on the following finding by the inventers of the present invention. That is, the reason for 5 msec. is determined based on the control performance of the DC voltage by the converter 2. In other words, it required at least 5 msec. of time for the converter 2 to lower the DC voltage. In addition, the reason for 500 msec. is that in consideration of the performance and life of the switching elements included in the inverter 4, a period of time of switching operation after boosting the DC voltage should be 500 msec. or less.

Embodiment 2

Figure 5:
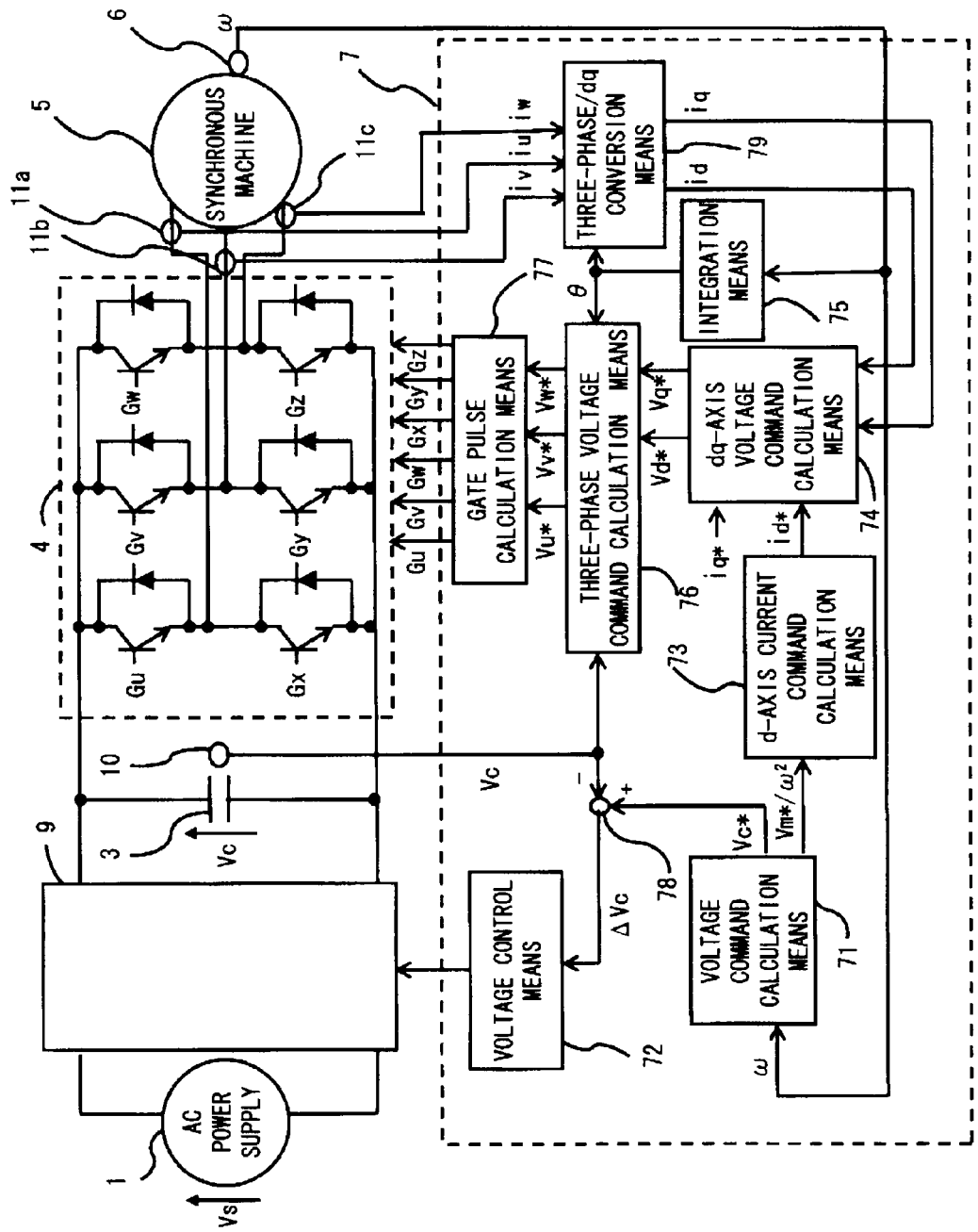
FIG. 5 is a configuration diagram illustrating a power conversion device according to embodiment 2 of the present invention.

FIG. 5 is a configuration diagram illustrating a power conversion device according to embodiment 2 of the present invention, and common reference numerals are used for components which correspond to those of embodiment 1 shown in FIG. 1.

In embodiment 2, an AC power supply 1 is used as an input, and accordingly, a converter 9 is an AC/DC converter which performs PWM (pulse width modulation) control for converting an AC voltage to a DC voltage. This converter 9 performs feedback control based on a difference ΔVc between the charge voltage Vc of the capacitor 3 and the charge voltage command Vc* thereto, and thus a capacitor voltage detection means 10 is provided to detect the charge voltage Vc of the capacitor 3. In addition, the control means 7 includes a subtractor 78 which subtracts the charge voltage Vc detected by the capacitor voltage detection means 10 from the charge voltage command Vc* to the capacitor 3 calculated by the voltage command calculation means 71.

Further, in embodiment 2, the dq-axis voltage command calculation means 74 of the control means 7 calculates the d-axis voltage command vd* and q-axis voltage command vq*, based on the difference between the d-axis current command id* and a detected d-axis current value id and the difference between the q-axis current command iq* and a detected q-axis current value iq. Thus, current detection means 11a, 11b, and 11c are provided to detect currents flowing into the synchronous machine 5. Further, the control means 7 includes a three-phase/dq conversion means 79 which performs coordinate transformation from phase currents iu, iv, and iw, which have been detected by the respective current detection means 11a, and 11b, and 11c, to the detected d-axis current value id and detected q-axis current value iq on rotating orthogonal two-axes (d-q axes) having a phase θ.

It is noted that, in embodiment 2, as the current detection means 11a to 11c on the AC side, a current transformer or the like is used to detect currents flowing through connection lines connecting between the inverter 4 and the synchronous machine 5. However, without limiting to this, phase currents can be detected from currents, such as a bus current, flowing inside the inverter 4, by means of a publicly known method. It is noted that since the relation of iu+iv+iw=0 is satisfied, currents of two phases may be detected, and then the current of the remaining one phase may be calculated based on the detected currents of the two phases.

Since the remaining configurations are the same as those in embodiment 1 shown in FIG. 1, no detailed description thereof will be made.

In the power conversion device having the above-described configuration, the charge voltage command Vc* calculated by the voltage command calculation means 71 in the same manner as embodiment 1, and the value of the charge voltage Vc of the capacitor 3 detected by the capacitor voltage detection means 10 are inputted to the subtractor 78. Accordingly, the subtractor 78 obtains the difference between Vc* and Vc, and inputs a value ΔVc obtained through the subtraction to the voltage control means 72. The voltage control means 72 controls the converter 9 so that the charge voltage Vc of the capacitor 3 corresponds to the charge voltage command Vc*. Accordingly, the charge voltage Vc of the capacitor 3 becomes equal to the charge voltage command Vc*.

Meanwhile, the current detection means 11a to 11c on the synchronous machine 5 side respectively detect the phase currents iu, iv, and iw generated by the synchronous machine 5, and the phase currents are inputted to the control means 7. Subsequently, the three-phase/dq conversion means 79 performs the coordinate transformation from the three-phase currents to currents on the rotating orthogonal two-axes. At this time, axes of control coordinates are required, and thus the phase θ of the axes of the control coordinates obtained from integration by the integration means 75 based on Expression (11) is incorporated. The three-phase/dq conversion means 79 performs coordinate transformation from the phase currents iu, iv, iw, which are obtained by the current detection means 11a to 11c, to the detected d-axis current value id and detected q-axis current value iq on the rotating orthogonal two-axis (d-q axes) coordinates having the phase θ, and outputs the transformation results to the dq-axis voltage command calculation means 74 in the subsequent step.

The dq-axis voltage command calculation means 74 calculates d-axis voltage command vd* and q-axis voltage command vq*, based on the d-axis current command id* calculated by the d-axis current command calculation means 73, the q-axis current command iq*=0, and the detected d-axis current value id and detected q-axis current value iq which are given from the three-phase/dq conversion means 79, using Expressions (15) and (16) below. It is noted that, in the case of iq*=0, as described above, there is the advantage that generation of torque can be prevented, based on the relation shown in Expression (2).

[Expression 15]

$$v_d^* = k_{cpd}\left(1 + \frac{\omega_{cpi}}{s}\right)(i_d^* - i_d) \tag{15}$$

[Expression 16]

$$v_q^* = k_{cpq}\left(1 + \frac{\omega_{cpi}}{s}\right)(0 - i_q) \tag{16}$$

It is noted that proportional gains kcpd, kcpq, and ωcpi may be given based on Expression (17) below by setting a current response target value ωcc. In addition, the current response target value ωcc needs to be set to a value sufficiently higher than the maximum speed at re-activation.

[Expression 17]

$$\begin{aligned} k_{cpd} &= \omega cc \times L_d \\ k_{cpd} &= \omega cc \times L_q \\ \omega_{cpi} &= \frac{\omega cc}{10} \end{aligned} \right\} \quad (17)$$

Next, in the same manner as in embodiment 1, the three-phase voltage command calculation means 76 calculates the voltage phase θv of the three-phase voltage commands, based on the d-axis voltage command vd* and q-axis voltage command vq* inputted from the dq-axis voltage command calculation means 74, using Expression (12) described above. In addition, the three-phase voltage command calculation means 76 calculates a modulation factor PMF based on the charge voltage Vc detected by the capacitor voltage detection means 10, using Expression (18) below.

[Expression 18]

$$PMF = \frac{\sqrt{(v_d^*)^2 + (v_q^*)^2}}{\frac{\sqrt{6}}{\pi} V_c} \quad (18)$$

Further, the three-phase voltage command calculation means 76 calculates the three-phase voltage commands vu*, vv*, and vw* using Expressions (15), (16), and (17) described above, based on Expression (14) also described above.

In this manner, the three-phase voltage commands vu*, vv*, and vw* calculated by the three-phase voltage command calculation means 76 are given to the gate pulse calculation means 77. The gate pulse calculation means 77 generates gate pulses Gu to Gz, based on the three-phase voltage commands vu*, vv*, and vw*, thereby to control the switching elements of the inverter 4 using the PWM (pulse width modulation) control.

As described above, in embodiment 2, an AC/DC converter is used as the converter 9, and the same effect as in embodiment 1 are obtained. In addition, with the current detection means 11a to 11c, calculation of the d-axis voltage command vd* and q-axis voltage command vq* by the dq-axis voltage command calculation means 74 in the control means 7 becomes easier, and the calculation load is reduced as compared to the case in embodiment 1. Thus, there is the advantage that an inexpensive microcomputer can be used to realize the control means 7.

Embodiment 3

Figure 6:
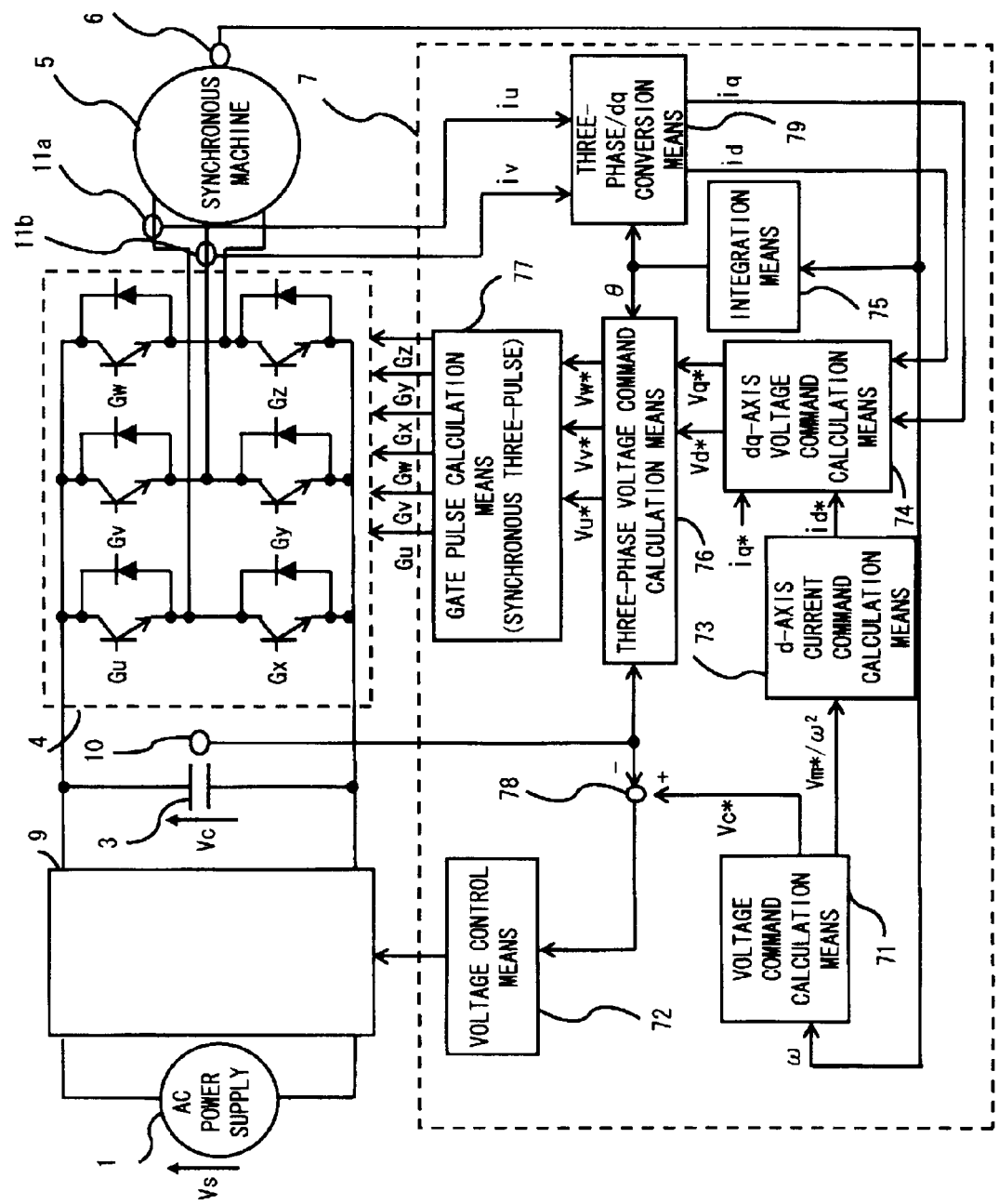
FIG. 6 is a configuration diagram illustrating a power conversion device according to embodiment 3 of the present invention.

FIG. 6 is a configuration diagram illustrating a power conversion device according to embodiment 3 of the present invention, and common reference numerals are used for components which correspond to those of embodiment 2 shown in FIG. 5.

The feature of embodiment 3 is that the configurations of the dq-axis voltage command calculation means 74 and the gate pulse calculation means 77 are different from those of embodiment 2.

That is, in this embodiment 3, the dq-axis voltage command calculation means 74 receives the d-axis current command id* calculated by the d-axis current command calculation means 73, the q-axis current command iq*=0, and the detected d-axis current value id and detected q-axis current value iq which are given from the three-phase/dq conversion means 79, and then calculates the d-axis voltage command vd* and q-axis voltage command vq*, using Expression (19) below.

[Expression 19]

$$\begin{bmatrix} v_d^* \\ v_q^* \end{bmatrix} = \begin{bmatrix} R^* & -\omega \cdot L_q^* \\ \omega \cdot L_d^* & R^* \end{bmatrix} \begin{bmatrix} i_d^* \\ i_q^* \end{bmatrix} + \begin{bmatrix} 0 \\ \omega \cdot \phi_a^* \end{bmatrix} + \begin{bmatrix} k_{cpd}\left(1 + \frac{\omega_{cpi}}{s}\right)(i_d^* - i_d) \\ k_{cpq}\left(1 + \frac{\omega_{cpi}}{s}\right)(0 - i_q) \end{bmatrix} \quad (19)$$

Expression (19) is a combination of the first term and the second term, which correspond to Expression (10) described in embodiment 1, and the third term which corresponds to Expressions (15) and (16) described in embodiment 2. Accordingly, high-performance control can be realized, and also it is possible to prevent transient generation of torque at the time of reactivation.

The d-axis voltage command vd* and q-axis voltage command vq* which are calculated by the dq-axis voltage command calculation means 74 are inputted to the three-phase voltage command calculation means 76 in the subsequent step. Accordingly, the three-phase voltage command calculation means 76 calculates the three-phase voltage commands Vu*, Vv*, and Vw*, and the calculated three-phase voltage commands Vu*, Vv*, and Vw* are inputted to the gate pulse calculation means 77. This process is the same as that in embodiments 1 and 2.

Figure 7:
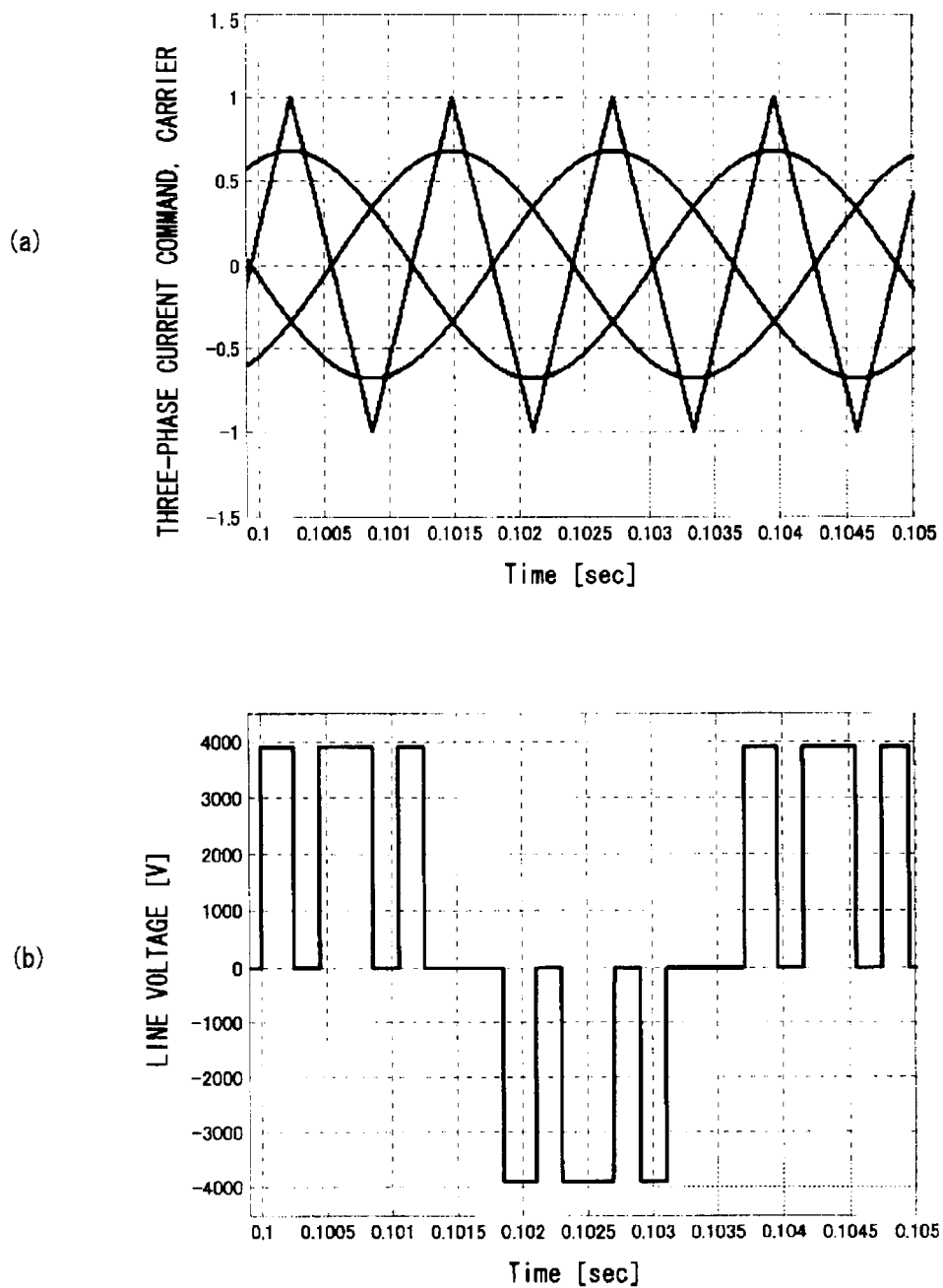
FIG. 7 is a diagram showing the relation of three-phase voltage commands of a synchronous three-pulse mode, a carrier frequency, and a line voltage in embodiment 3 of the present invention.

The gate pulse calculation means 77 outputs the gate pulses Gu to Gz, which are in a synchronous three-pulse mode, based on the three-phase voltage commands Vu*, Vv*, and Vw*, thereby to control the switching elements included in the inverter 4 using the PWM control. That is, as shown in FIG. 7(a), when the gate pulses Gu to Gz for PWM control are to be generated, in the case where the frequency of the three-phase voltage commands (sinusoidal wave) corresponding to the rotational speed of the synchronous machine 5 is represented as fsin, and the carrier frequency of a triangle wave is represented as fc, 3fsin=fc is satisfied. Thus, as shown in FIG. 7(b), three pulses can be certainly secured for each of the gate pulses Gu to Gz per half cycle of the rotational speed.

Here, when the inverter 4 is to be re-activated from a high speed region while the switching elements included in the inverter 4 cannot increase the carrier frequency sufficiently by heat, a sufficient number of pulses for achieving sufficient control performance cannot be secured for each gate pulse of the inverter 4. For example, the inverter 4 is re-activated while the carrier frequency is 600 Hz and the synchronous machine 5 has the rotational speed (frequency) of 300 Hz, the number of pulses each switching element of the inverter 4 can secure is two pulses per half cycle of the rotational speed of 300 Hz, which may be an insufficient number of pulses to secure sufficient control performance.

On the other hand, since this embodiment 3 employs the synchronous three-pulse mode, three pulses are certainly secured per half cycle of the rotational speed of the synchronous machine 5. Accordingly, even in the case of re-activation from a high speed region, the number of pulses can be secured, and the control performance can be improved. Further, employment of the synchronous pulse mode improves voltage utilization factor. Consequently, a current flowing to the synchronous machine 5 can be decreased, and downsizing and energy saving of the inverter 4 can be realized.

It is noted that, in embodiment 3, only the synchronous three-pulse mode have been described. However, it is understood that a synchronous five-pulse mode or synchronous nine-pulse mode will exert a similar effect. Since other configurations and operational effects are the same as those in embodiment 2, no detailed description thereof will be made.

Embodiment 4

Figure 8:
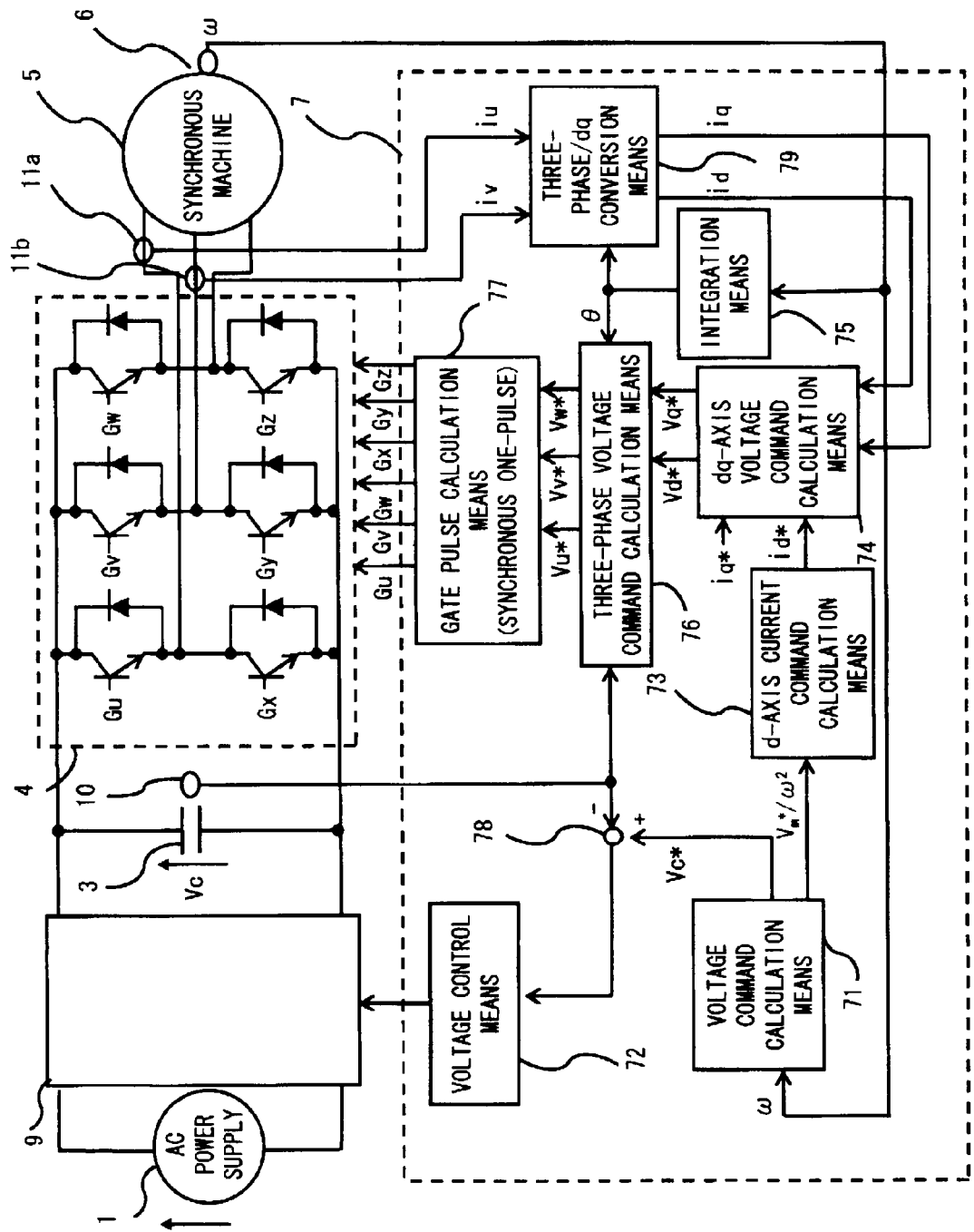
FIG. 8 is a configuration diagram illustrating a power conversion device according to embodiment 4 of the present invention.

FIG. 8 is a configuration diagram illustrating a power conversion device according to embodiment 4 of the present invention, and common reference numerals are used for components which correspond to those of embodiment 3 shown in FIG. 6.

The feature of embodiment 4 is that the configuration of the gate pulse calculation means 77 is different from that of embodiment 3.

That is, in embodiment 4, the gate pulse calculation means 77 outputs gate pulses Gu to Gz, which are in a synchronous one-pulse mode, based on the three-phase voltage commands Vu*, Vv*, and Vw*, thereby to control the switching elements included in the inverter 4 using the PWM control. That is, when the gate pulses Gu to Gz for PWM control are to be generated, in the case where the frequency of the three-phase voltage commands (sinusoidal wave) corresponding to the rotational speed of the synchronous machine 5 is represented as fsin, and the carrier frequency of a triangle wave is represented as fc, fsin=fc is satisfied.

In this manner, in embodiment 4, the gate pulse calculation means 77 outputs the gate pulses Gu to Gz, which are in a synchronous one-pulse mode. Accordingly, in this embodiment, although the control performance is inferior to that in embodiment 3, the voltage utilization factor of the inverter 4 can be improved. In addition, as compared to embodiment 3, the current flowing to the synchronous machine 5 can be further decreased, and downsizing and energy saving of the inverter 4 can be realized.

Since other configurations and operational effects are the same as those in embodiment 3, no detailed description thereof will be made.

Embodiment 5

Figure 9:
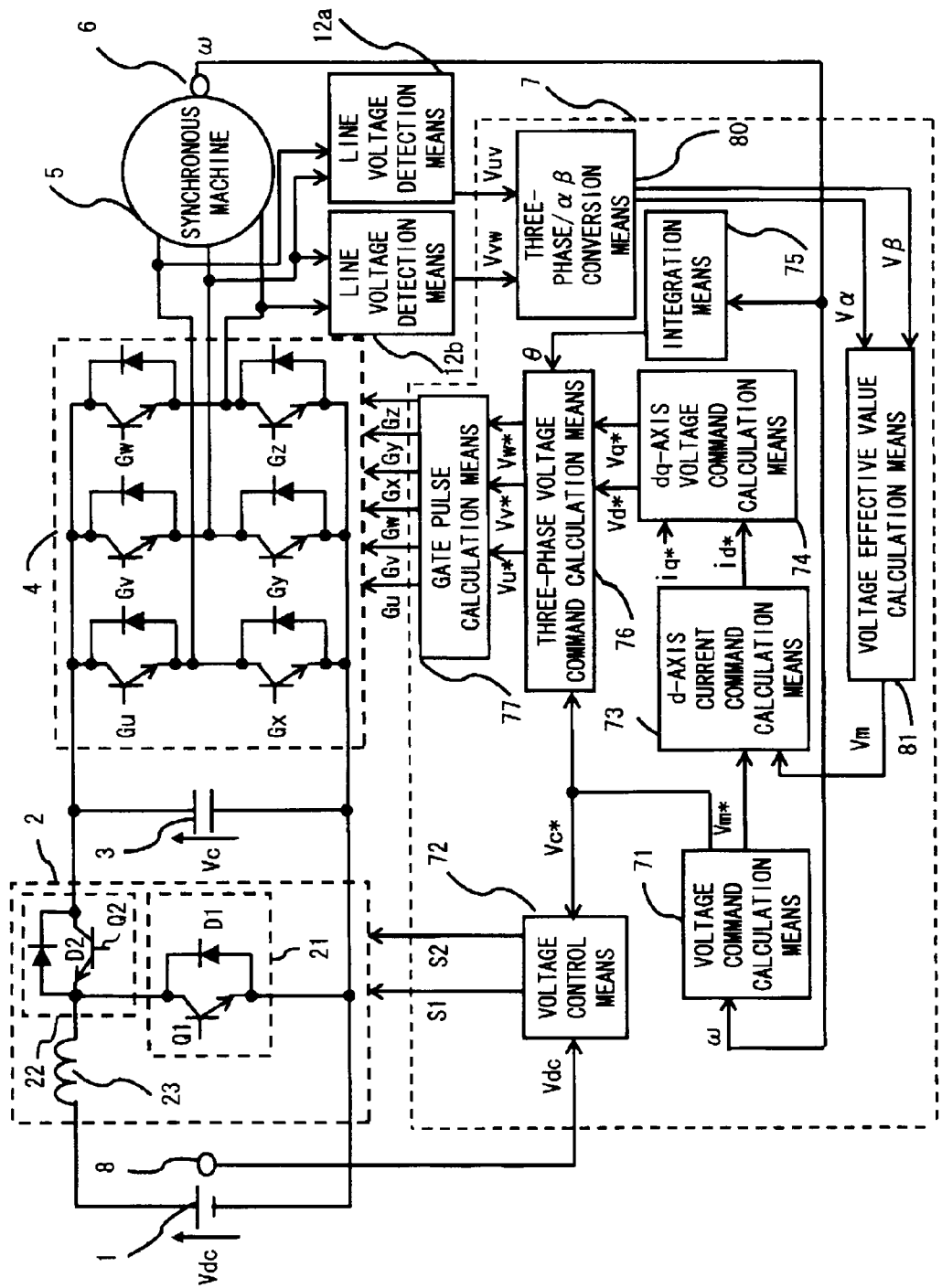
FIG. 9 is a configuration diagram illustrating a power conversion device according to embodiment 5 of the present invention.

FIG. 9 is a configuration diagram illustrating a power conversion device according to embodiment 5 of the present invention, and common reference numerals are used for components which correspond to those of embodiment 1 shown in FIG. 1.

The feature of embodiment 5 is that, in addition to the configuration of embodiment 1 (FIG. 1), line voltage detection means 12a and 12b are provided. In addition, the configurations of the voltage command calculation means 71 and the d-axis current command calculation means 73 included in the control means 7 are changed. Moreover, a three-phase/αβ conversion means 80 and a voltage effective value calculation means 81 are provided in the control means 7.

That is, the line voltage detection means 12a and 12b respectively detect the line voltage Vuv between UV and the line voltage Vvw between VW of the synchronous machine 5. The detected line voltages Vuv and Vvw are inputted to the three-phase/αβ conversion means 80. The three-phase/αβ conversion means 80 calculates two-phase AC voltages Vα and Vβ based on the inputted Vuv and Vvw, using Expression (20) below.

[Expression 20]

$$\begin{bmatrix} V\alpha \\ V\beta \end{bmatrix} = \sqrt{\frac{2}{3}} \begin{bmatrix} 1 & \frac{1}{2} \\ 0 & \frac{\sqrt{3}}{2} \end{bmatrix} \begin{bmatrix} Vuv \\ Vvw \end{bmatrix} \quad (20)$$

Figure 10:
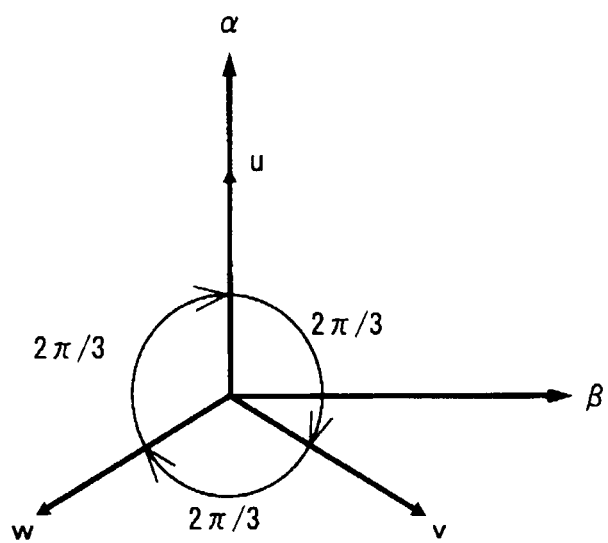
FIG. 10 is a diagram showing the relation between a three-phase AC coordinate system and a two-phase AC coordinate system.

It is noted that when the three-phase AC voltages Vuv and Vvw (or Vu, Vv, and Vw) are to be transformed into the two-phase AC voltages Vα and Vβ by using Expression (20), the transformation is performed by using the relation between the three-phase AC coordinate system (u-v-w) and the two-phase AC coordinate system (α-β) illustrated in FIG. 10.

The subsequent voltage effective value calculation means 81 calculates the line voltage peak value Vm of the synchronous machine 5, based on the two-phase AC voltages Vα and Vβ which are transformed by the three-phase/αβ conversion means 80, using Expression (21) below.

[Expression 21]

$$Vm = \sqrt{2}\sqrt{V\alpha^2 + V\beta^2} \quad (21)$$

Then, the line voltage peak value Vm of the synchronous machine 5 calculated by the voltage effective value calculation means 81 is given to the d-axis current command calculation means 73.

Figure 11:
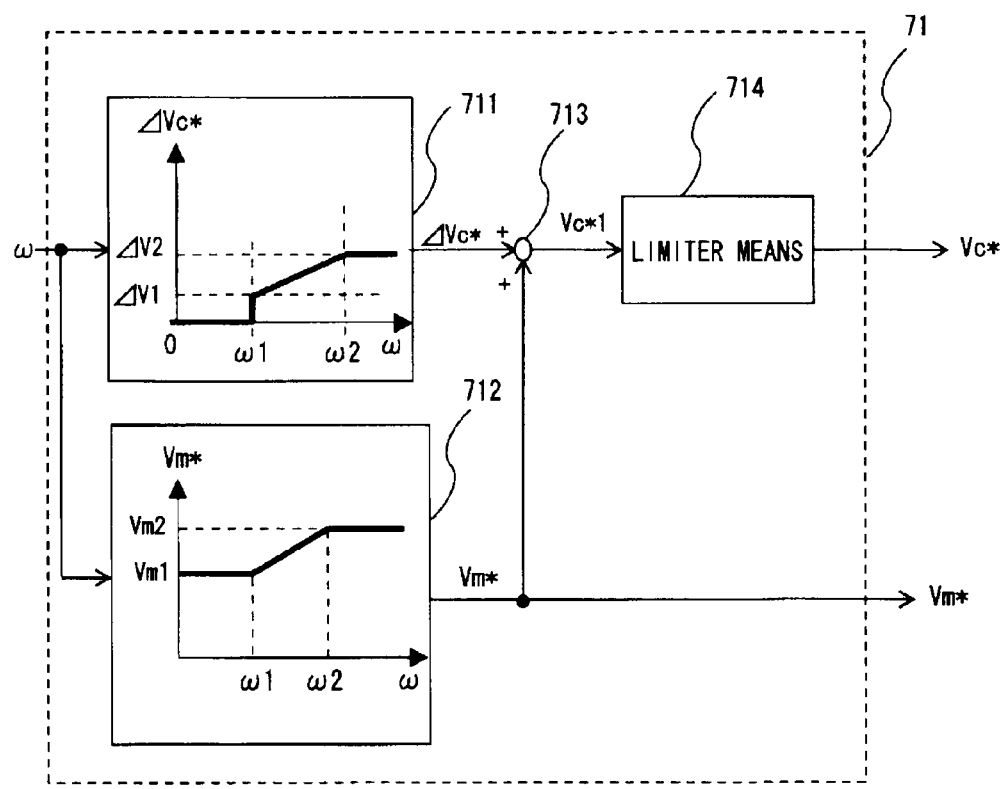
FIG. 11 is a configuration diagram illustrating in detail a voltage command calculation means according to embodiment 5 of the present invention.

Meanwhile, the voltage command calculation means 71 is configured, unlike the voltage command calculation means 71 provided in embodiment 1 (FIG. 2), to output the charge voltage command Vc* to the capacitor 3 and the line voltage peak value command Vm*, as shown in FIG. 11.

Therefore, the d-axis current command calculation means 73 calculates the d-axis current command id*, based on the line voltage peak value Vm of the synchronous machine 5 and the line voltage peak value command Vm*, so that the line voltage peak value Vm applied to the synchronous machine 5 at the time of re-activating the inverter 4 does not exceed the charge voltage Vc of the capacitor 3. That is, the d-axis current command id* is calculated, by using Expression (22) below.

[Expression 22]

$$i_d^* = k_p\left(1 + \frac{\omega_p}{s}\right)(V_m^* - V_m) \quad (22)$$

Here, kp and ωp are expressed as Expression (23) below, where the maximum rotational speed of the synchronous machine 5 is represented as ωmax.

[Expression 23]

$$\left. \begin{array}{l} k_p = \omega_{max} \times 10 \\ \omega_p = \dfrac{k_p}{10} = \omega_{max} \end{array} \right\} \quad (23)$$

As described above, in embodiment 5, in addition to the effect described in above embodiment 1, since the line voltage detection means 12a and 12b are provided, complicated square root calculations can be eliminated. As a result, there is the advantage that an inexpensive microcomputer can be used to realize the control means 7.

Since other configurations and operational effects are the same as those in embodiment 1, no detailed description thereof will be made.

Embodiment 6

Figure 12:
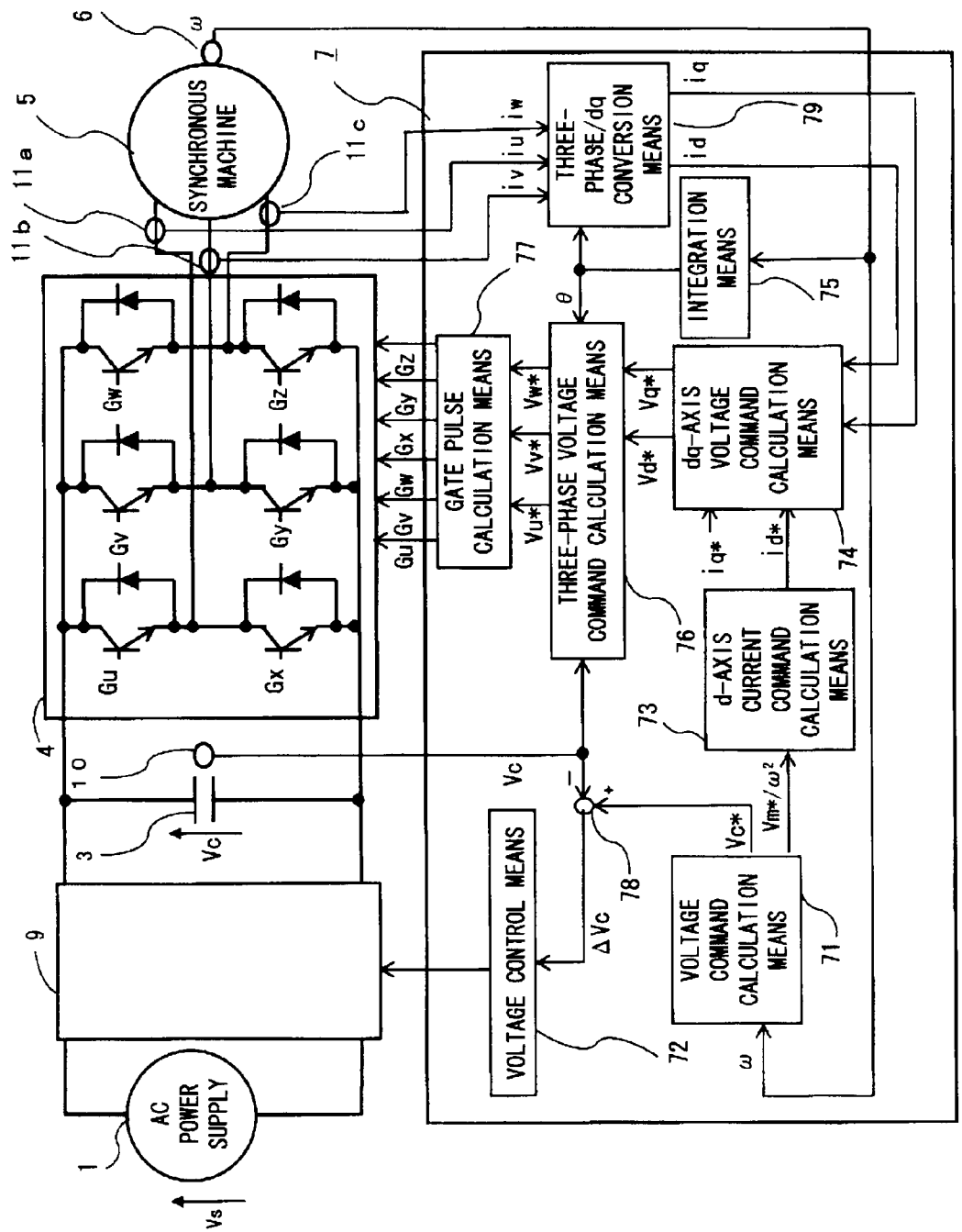
FIG. 12 is a configuration diagram illustrating a power conversion device according to embodiment 6 of the present invention.

FIG. 12 is a configuration diagram illustrating a power conversion device according to embodiment 6 of the present invention, and common reference numerals are used for components which correspond to those of embodiment 2 shown in FIG. 5.

The feature of embodiment 6 is that, from the time point when an operation command is turned OFF, the q-axis current command iq* given to the dq-axis voltage command calculation means 74 is gradually decreased, and along with this, the charge voltage command Vc* outputted from the voltage command calculation means 71 is increased so as to gradually increase the charge voltage Vc of the capacitor 3. Accordingly, a current flowing to the synchronous machine 5 when the inverter 4 is to be stopped can be further decreased. That is, due to the decrease in current, energy saving can be realized.

Figure 13:
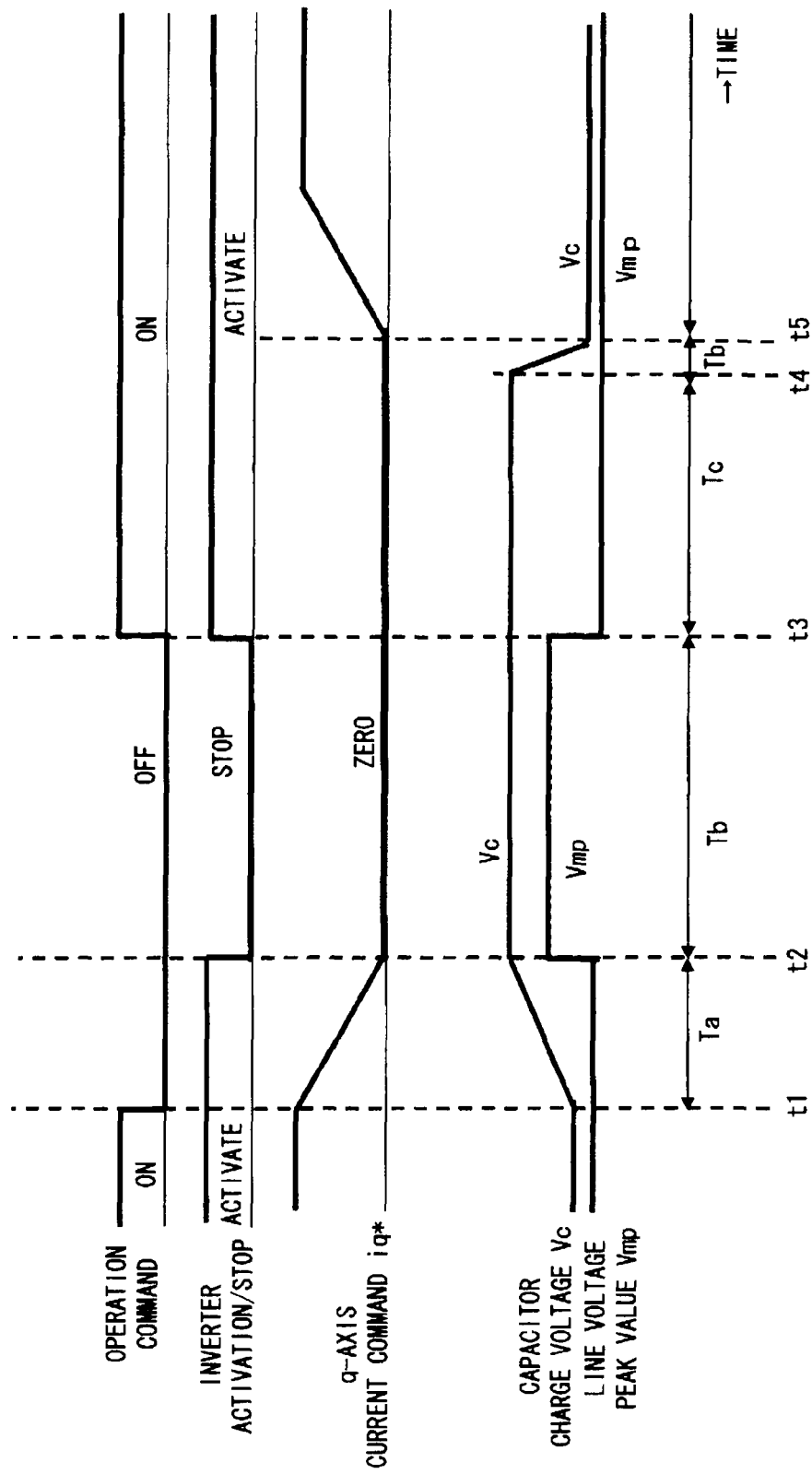
FIG. 13 is a timing chart for illustrating an operation according to embodiment 6 of the present invention.

FIG. 13 is a timing chart for illustrating an operation of the power conversion device of this embodiment 6.

As illustrating in the diagram, during a period from time t1 when the operation command is turned OFF to time t2, the q-axis current command iq* is gradually decreased to zero, and along with this operation, the charge voltage command Vc* is gradually increased until the charge voltage Vc of the capacitor 3 reaches a predetermined value. Accordingly, it is possible to effectively decrease the current flowing to the synchronous machine 5 as compared to the case where the q-axis current command iq* is set to zero immediately at the time when the operation command is turned OFF, and then the charge voltage Vc of the capacitor 3 is increased to a predetermined value.

Figure 14:
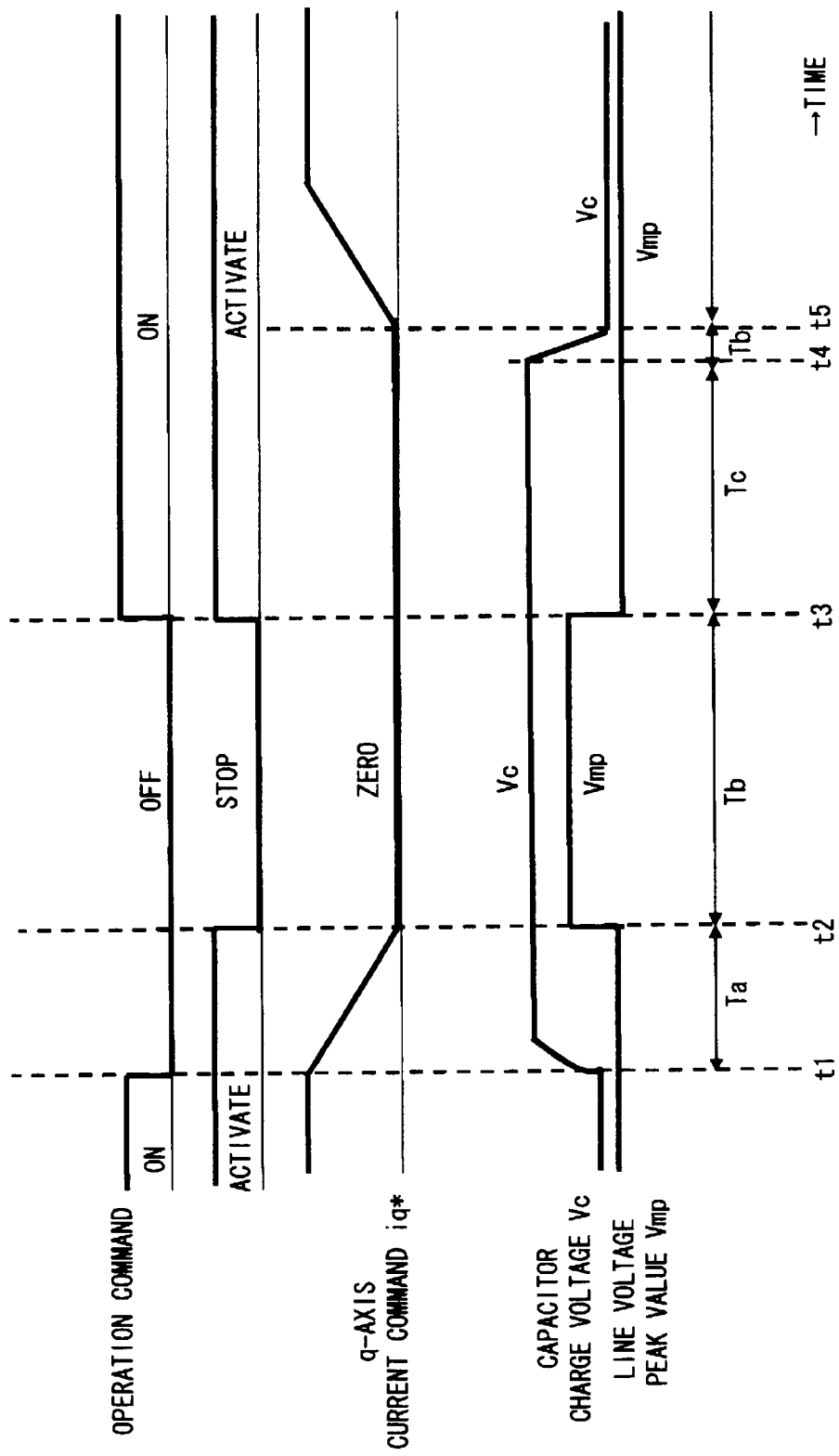
FIG. 14 is a timing chart for illustrating an operation according to embodiment 6 of the present invention.

In addition, as shown in FIG. 14, from time t1 when the operation command is turned OFF to time t2, the charge voltage Vc of the capacitor 3 may be first increased to the predetermined value, and then the q-axis current command iq may be gradually decreased to zero. In this case, the charge voltage Vc of the capacitor 3 may be increased rapidly (or step by step) as shown in the diagram, or may be increased moderately like first-order lag. This is effective for prevention of a change in current, overvoltage of the charge voltage Vc of the capacitor 3, or the like.

As described above, in embodiment 6, in addition to the effects of above embodiment 2, the q-axis current command iq* and the charge voltage Vc of the capacitor 3 are concurrently operated when an operation command is turned OFF. As a result, there is the advantage that the current flowing to the synchronous machine 5 can be decreased and energy saving can be realized.

Since other configurations and operational effects are the same as those in embodiment 2, no detailed description thereof will be made.

INDUSTRIAL APPLICABILITY

The present invention is broadly applicable as a power conversion device which is mounted to railway vehicles and electric vehicles, for example, and which controls the synchronous machine driven by power supply.

The invention claimed is:
1. A power conversion device, comprising:
a first power converter which obtains a DC voltage from a power supply;
a capacitor which is connected to an output side of the first power converter;
a second power converter which converts the DC voltage of the capacitor into an AC voltage and outputs the AC voltage to a synchronous machine;
rotation information detection means which detects rotation information of the synchronous machine; and
control means which controls the first power converter and the second power converter, based on the rotation information detected by the rotation information detection means, wherein
the control means controls, during a coasting operation mode, the second power converter to stop after the capacitor is boosted to a value corresponding to a charge voltage command, and
based on the rotation information of the synchronous machine detected by the rotation information detection means, the control means controls the second power converter so that a voltage generated at a terminal of the synchronous machine is lower than or equal to a charge voltage of the capacitor and controls the first power converter so that the charge voltage of the capacitor is equal to or higher than the voltage generated at the terminal of the synchronous machine at the time of re-activation of the second power converter from the coasting operation mode.

2. The power conversion device according to claim 1, wherein the control means controls, during the coasting operation mode, the first power converter so that the charge voltage of the capacitor is higher than the voltage generated at the terminal of the synchronous machine.

3. The power conversion device according to claim 2, wherein the control means controls the second power converter so that the second power converter performs switching in a synchronous pulse mode.

4. The power conversion device according to claim 3, wherein the control means controls the second power converter so that the second power converter performs switching in a synchronous one-pulse mode.

5. The power conversion device according to claim 1, wherein the control means controls a q-axis current, which flows to the synchronous machine, to be zero.

6. The power conversion device according to claim 5, wherein the control means controls the second power converter so that the second power converter performs switching in a synchronous pulse mode.

7. The power conversion device according to claim 6, wherein the control means controls the second power converter so that the second power converter performs switching in a synchronous one-pulse mode.

* * * * *

UNITED STATES PATENT AND TRADEMARK OFFICE
CERTIFICATE OF CORRECTION

PATENT NO. : 8,643,316 B2  
APPLICATION NO. : 13/058888  
DATED : February 4, 2014  
INVENTOR(S) : Masaki Kono et al.

Page 1 of 1

It is certified that error appears in the above-identified patent and that said Letters Patent is hereby corrected as shown below:

In the Specification

Column 5, line 63, change "1Vm1" to --|Vm|--.

Signed and Sealed this  
Twenty-seventh Day of May, 2014

Michelle K. Lee  
*Deputy Director of the United States Patent and Trademark Office*